United States Patent [19]
Kennedy et al.

[11] 3,785,580
[45] Jan. 15, 1974

[54] WIRE GUIDES FOR ARMATURE WINDING MACHINES

[75] Inventors: John B. Kennedy, Springfield; Kenneth L. Pepper, Kettering, both of Ohio

[73] Assignee: The Globe Tool and Engineering Company, Dayton, Ohio

[22] Filed: Dec. 20, 1971

[21] Appl. No.: 209,644

[52] U.S. Cl. ............ 242/7.05 B, 29/205 R, 29/598, 242/7.03
[51] Int. Cl. .......................................... H02k 15/09
[58] Field of Search ................. 242/7.05 B, 7.05 A, 242/7.05 R, 7.05 C, 7.03; 29/596, 598, 205 R

[56] References Cited
UNITED STATES PATENTS

| | | | |
|---|---|---|---|
| 1,662,881 | 3/1928 | Chapman | 242/7.05 A |
| 3,076,613 | 2/1963 | Turk | 242/7.05 B |
| 2,627,379 | 2/1953 | Moore | 242/7.05 B X |

Primary Examiner—Billy S. Taylor
Attorney—Dvbvig & Dvbvig

[57] ABSTRACT

The opposed chucks of a double flier armature winding machine are each provided with two disc-shaped rotatable wire guide members. Each of the wire guide members has four equally circumferentially spaced wire guiding surface portions which are successively positioned in the path of the wire used in winding coils for forming the coil end turns toward the armature shaft. The degree of forming depends upon the contour of the particular surface portion positioned in the path of the wire during the winding of a given coil. Further disclosed is a drive assembly for rotating the wire guide members. The drive assembly is normally positioned remote from the winding area and advanced into the winding area for rotating the wire guide members when desired during the intervals between the winding of coils.

8 Claims, 5 Drawing Figures

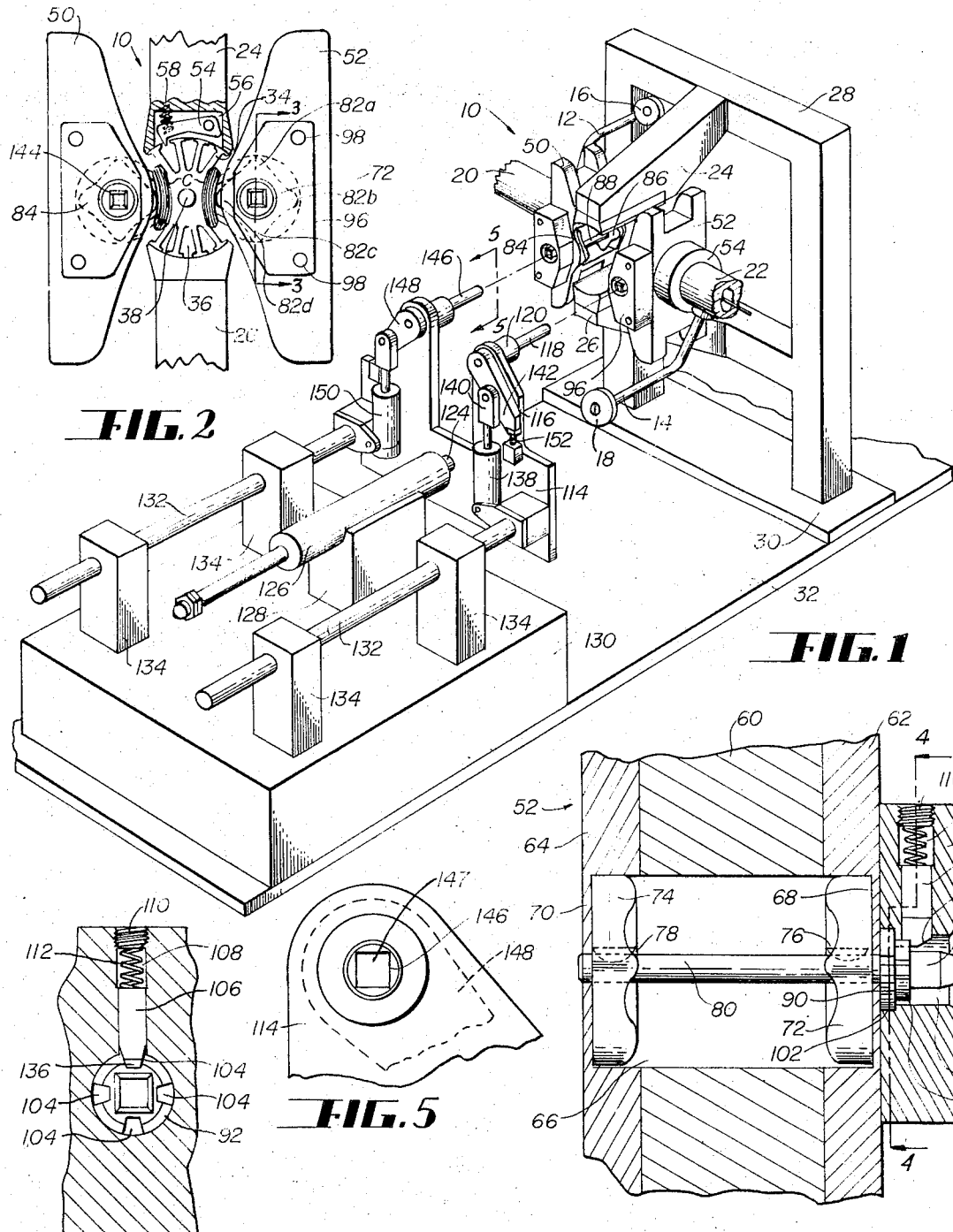

WIRE GUIDES FOR ARMATURE WINDING MACHINES

BACKGROUND OF THE INVENTION

This invention relates to wire guides for armature winding machines and especially for automatic double flier armature winding machines, although, as will become apparent, the invention is equally applicable to single flier armature winding machines.

In an ordinary automatic double flier armature winding machine, an armature is supported between a pair of winding forms or chucks, the confronting faces of which are so aligned with the armature slots that the wires wound into coils by the rotating fliers are guided into pairs of armature slots. The winding forms are spread apart at the end of the winding of the armature to permit its removal and also to permit the insertion of an unwound armature therebetween. In some armature winding machines the winding forms or chucks support the armature and in some cases the winding forms are spread apart when indexing the armature to present new pairs of slots in position for receiving coils. During the winding of coils, the confronting faces of the winding forms are maintained at a fixed distance and the winding forms invariably guide or urge the wire forming the coil turns into substantially uniform positions relative to the armature shaft. Other wire guides have been provided for guiding the wire between the winding of coils such as around commutator hooks.

In winding some armatures there is a problem in that the end turns of coils wound during the earlier portions of the winding cycle support end turns of subsequently wound coils so far from the armature shaft that it becomes difficult or even impossible to wind all of the coils into the armature slots. This problem is encountered in the winding of an armature for a four-pole motor because the wound coils span only approximately 90° of the circumference of the armature. There is a tendency for the coils of four-pole armatures to be wound onto intermediate portions of the armature slots rather than in the bottoms of the slots, and the end turns, if not properly guided and formed, will be quite far from the armature shaft. The ordinary fixed winding forms used in double flier machines are not adequate to overcome this problem. Obviously, fixed winding forms designed to bend or contour the end turns of the first wound coils quite close to the armature shaft would not be appropriate for forming the end turns of the later wound coils.

A related problem has been encountered in the winding of stators having radially extending, outwardly opening slots. Such stators have been wound on an automatic machine having means for rotating the stator while drawing wire from a wire guide. where there has been an end turn buildup problem, two or more sets of winding forms, each having fixed wire guide plates, have been separately mounted upon a turret. The turret is rotated to bring different ones of the winding form set into the path of the wire at different stages of the coil winding cycles. So far as known, the use of separate sets of turret mounted winding forms has never been attempted in flier type armature winders. It is doubted that such use would be practical from the standpoints of machine cost, reliability and cycle time.

SUMMARY OF THE INVENTION

This invention relates to improved winding forms in which the forms are provided with variable wire guiding surfaces especially adapted to the forming of the coil end turns during the winding of the coils. The forming of the end turns will, in most cases, also have an effect upon the positioning of the coil sides in the armature slots. When using the apparatus of this invention, the end turns of the coils are formed or bent toward the armature shaft as the coils are wound and as a consequence the coil sides within the armature slots are forced to the bottoms of the slots.

The apparatus of this invention includes disc-like wire guides incorporated in the winding forms which straddle the armature core. The disc-like guides are rotatably mounted about axes parallel to the axis of the armature shaft and means are provided to incrementally rotate the disc-like guides in time relation to the rotation of the fliers. The disc-like wire guides have plural, differently contoured, lobe-like wire guide surfaces which are selectively positioned adjacent the armature shaft by rotation of the wire guides. In use, a selected lobe-like surface portion is positioned adjacent the armature shaft during the winding of one coil and different surface portions are similarly positioned when winding other coils. The selected surface portions provide a greater or lesser degree of forming of the end turns toward the armature shaft. Stop means are provided for accurately locating the disc-like wire guides about their axes of rotation during the intervals in which the fliers are rotating.

In addition to the provision of the novel wire guides, another object of this invention is to provide an improved method for winding armatures including the different forming of coil end turns utilizing guides mounted in the winding forms.

Other objects and advantages will become apparent from the following description and the drawing.

BRIEF DESCRIPTION OF THE DRAWING

FIG. 1 is a perspective view of a portion of an automatic armature winding machine provided with the wire guides of this invention.

FIG. 2 is an end elevational view of winding forms and wire guides shown in FIG. 1 and further illustrating a partially wound armature mounted therebetween.

FIG. 3 is a cross sectional view of one of the winding forms taken along section line 3—3 of FIG. 2.

FIG. 4 is a cross sectional view taken along section line 4—4 of FIG. 3 of a portion of a stop and a common shaft for two of the wire guides.

FIG. 5 is an elevational view as viewed in the direction of arrows 5—5 of FIG. 1 of a portion of a drive mechanism.

DESCRIPTION OF THE PREFERRED EMBODIMENT

A portion of the tooling, generally designated 10, for an armature winding machine is illustrated in FIGS. 1 and 2. The illustrated portion includes a left hand flier 12 and a right hand flier 14 having flier pulleys 16 and 18, respectively, at their free ends. The fliers 12 and 14 are mounted upon drive spindles 20 and 22, respectively. The illustrated tooling further includes an upper center wire guide 24 and a lower center wire guide 26, both of which are mounted upon a support member 28 mounted by means including a plate 30 onto a suitable support plate or machine bed 32. The center wire guides 24 and 26 assist in guiding the wire into the armature slots.

The parts as thus far described may be entirely conventional. As well known to those familiar with the double flier armature winding art, pairs of coils such as those designated C in FIG. 2 may be wound simultaneously by rotation of the fliers 12 and 14 with wire which is drawn from wire supplies (not shown) through the flier spindles 20 and 22 and around the flier pulleys 16 and 18. Suitable provision is made for drawing the wire to form coil lead wires which extend between coils and make connection to a commutator (not shown) at the end of the winding of a first pair of coils. The armature may then be indexed to present new pairs of slots in position for receiving the wire for winding the next pair of coils. The manner of forming the wire leads, their connections to the commutator, as well as the apparatus used for this purpose, are not illustrated herein and form no part of this invention. Similarly the method and apparatus for appropriately driving the flier spindles 20,22 for supporting the armature, and for indexing the armature may be entirely conventional and are not described or shown herein.

In FIG. 2, an armature core 34 is illustrated in the position it would occupy at the end of the winding of the coils C in pairs of coil receiving slots 36 thereof. The illustrated tooling 10 is of the type which may be used when winding armatures for four-pole dynamo electric machines and it will be noted that the coils C each span approximately 90° of the total circumference of the armature. Also it will be noted that there is a significant spacing between the coil end turns and the armature shaft, designated 38. (As those familiar with the art are aware, the expression "coil end turns" refers to the portions of the coils spanning between slots and projecting beyond the end faces of the armature core. Thus, those portions of the coils C which can be seen in FIG. 2 are end turns and there are other end turns projecting beyond that end face of the armature core 34 which is hidden in FIG. 2. The expression "coil sides" refers to the portions of the coils lying in the coil receiving slots 36.) As other coils are wound into other pairs of slots 36, the end turns of the previously wound coils will support the end turns of the latter wound coils at a still greater spacing from the shaft 38. Therefore, when winding armatures for four-pole machines, it is difficult to wind a full complement of coils because the end turns of the last coils to be wound are spaced so far from the space that there is insufficient space remaining in the slots for the coils.

With continued reference to FIGS. 1 and 2, the tooling 10 includes a left side winding form 50 and a right side winding form 52. The winding form 52 is connected by a bearing member 54 to the drive spindle 22. The winding form 50 is also connected by a bearing (not shown) to the drive spindle 20. The mounting of winding forms upon the drive spindles in double flier winding machines is conventional. Also it is conventional to mount a dog in one of the winding forms 50 or 52 for accurately positioning the armature at the end of each armature indexing step. However, where there is an unusual end turn buildup problem, it may be impossible to position the winding forms 50 and 52 sufficiently close to the armature that the usual stop dog will reliably engage and position the armature. For this reason a stop dog 54 is shown pivotally mounted within a cavity 56 in the upper center wire guide 24, the stop dog 54 being biased by a spring 58 into engagement with the armature so that it will enter one of the armature slots 36 for stopping the armature after each index. It will be understood, however, that if conditions warrant, the stop dog could be mounted on one of the winding forms 50 and 52. Also, depending upon the design of the armature and the winding pattern, the confronting faces of the winding forms 50 and 52 alone could be used in guiding the wire into the armature slots, and, in such an event, the center winding forms 24 and 26 would not be necessary.

In accordance with this invention, the winding forms 50 and 52 are each provided with means for biasing or urging the end turns of the coils radially inwardly toward the armature shaft while the coils are being wound. Both of the winding forms 50 and 52 may be constructed as mirror images and, therefore, the detailed description thereof which follows is made with reference only to the winding form 52.

Referring to FIGS. 2 and 3, the winding form 52 may comprise a plate-like body member 60 provided with a front end plate 62 and a rear end plate 64 which may be affixed to or integral with the body member 60. A cavity or chamber 66 opening to the armature at the winding station is formed in the body member 60 and the end plates 62 and 64, the cavity 66 being bounded at its sides by web portions 68 and 70, respectively, of the end plates 62 and 64. Received within the cavity 66 are a pair of cam-like wire guide discs 72 and 74 which are connected as by keys 76 and 78, respectively, to a shaft or axle 80 which is journalled for rotation in the web portions 68 and 70. As best shown in FIG. 2, the axis of rotation of the shaft 80 and, accordingly, the discs 72 and 74 is parallel to the longitudinal axis of the armature shaft 38.

The two discs 72 and 74, which are located adjacent opposite ends of the armature core 34, are substantially identically constructed. In the embodiment illustrated they each have four lobes or wire guide surfaces portions equally circumferentially spaced along the outer margin thereof. The lobes of disc 72 are designated 82a, 82b, 82c and 82d. One of the lobes of each disc 72,74 is positioned to guide the wire forming the coil ends turns during the winding of each of said coils into the armature. In most circumstances the lobe in position for guiding the first coil wound by a flier, such as lobe 82d, will have the most extreme arc, reaching nearest the armature shaft, and will, accordingly, cause the end turns of the first coil wound to be bent or formed radially inwardly into a location relatively close to the armature shaft. The same lobe 82d may be used for winding the second coil wound by the same flier but is not used for winding all of the coils because the end turns of the first wound coils prevent the end turns of subsequently wound, overlapping coils from being bent so far toward the armature shaft. Accordingly, at predetermined intervals, the discs 72 and 74 are rotated through 90° to position others of the lobes in confronting relation to the armature shaft, the other lobes having less estreme arcs or contours and bending the end turns toward the armature shaft by lesser amounts. The precise form of the various lobes will depend upon the design of the armature including the number of coils to be wound, the degree of difficulty in causing the coil sides to move to the bottoms of the armature slots, and the thickness of the wire. Also the number of coils which will be wound with a given lobe guiding the end turns will differ for different armature designs.

As already mentioned, the winding forms 50 and 52 may be identically constructed and it will be noticed in FIGS. 1 and 2 that the winding form 50 is provided with disc 84 and 86, both having four lobes, mounted on a common shaft or axle 88. The shaft 88 also rotates about an axis parallel to the armature shaft 38, and the axes of the shafts 80 and 88 are preferably coplanar with the armature shaft 38.

Apparatus for rotating or indexing the discs 72, 74 as well as the discs 84, 86 is illustrated in FIGS. 1, 3, 4 and 5. In FIG. 3 it will be noted that an end of the shaft 80 projects beyond the front end plate 62 and the projecting end portion is provided with a first disc-shaped flange 90 which is affixed thereto in any suitable fashion, a second disc-shaped flange 92 which has a smaller diameter than the first flange 90, and a square end fitting 94. A housing member 96 is mounted on the front end plate 62 as by bolts 98 (FIG. 2), the housing member 96 having a horizontal bore 100 which is counterbored at 102 adjacent the face of the front end plate 62. The first flange 90 is confined between the base of the counterbore 102 and the front end plate 62 to prevent axial movement of the shaft 80. With reference to FIG. 4, the flange 92 has four equally circumferentially spaced, radially inwardly extending notches 104 adapted selectively to receive the end of a stop dog 106 slidably mounted in a vertically extending housing bore 108 closed by a threaded end cap 110. The stop dog 106 is biased downwardly by a spring 112 located in the upper end of the bore 108 into a position wherein it engages within one of the slots 104 for the purpose of locking the flange 92 and, accordingly, the shaft 80 and the discs 72 and 74 affixed thereto against rotation. As illustrated, the lower end of the stop dog 106 may be beveled to provide converging surfaces and the side walls of the notches 104 may be correspondingly outwardly divergent so as to be able to snugly receive the beveled sides of the stop dog 106.

With reference to FIGS. 1 and 3, the stop dog 106 is removed from locking engagement with one of the notches 104 and the shaft 80 and, accordingly, the discs 72 and 74 drivingly rotated through 90° by a drive assembly which includes a mounting plate 114 having an upwardly extending leg portion 116. A drive shaft 118 is journalled for rotation such as by a bearing 120 mounted upon the front face of the leg portion 116. The longitudinal axis of the drive shaft 118 is aligned with the longitudinal axis of the shaft 80 and the end of the drive shaft 118 facing the square end fitting 94 has a square internal bore 122 adapted to slidably receive the end fitting 94.

During the winding of armature coils, the drive shaft 118 is spaced remotely from the winding form 52 so as not to obstruct the rotation of the flier 14. For this purpose the mounting plate 114 is mounted on the end of a piston rod 124 of an air actuator or other linear motor 126 which in turn is connected by a bracket 128 to a support 130 on the support plate or machine bed 32. The mounting plate 114 is guided and further supported by a pair of guide rods 132 slidably mounted in bearing members 134 also mounted on the support 130. When it is desired to rotate the discs 72 and 74 to present different ones of the wire guide surfaces in confronting relation to the armature shaft, the actuator 126 is energized to advance the plate 114 and, accordingly, the drive shaft 118 toward the winding form 52. As the drive shaft 118 approaches the terminal end of its movement toward the winding form 52, it first slidably engages a beveled front edge portion 136 of the stop dog 106 and cams it upwardly into the bore 108 out of engagement with the notched flange 92. Substantially simultaneously the square end fitting 94 is received by the square bore 122 so that the shaft 80 is unable to rotate except upon rotation of the drive shaft 118. To minimize relative movement between the square bore 122 and the end fitting 94, these pairs fit snugly together. So that the bore 122 and end fitting 94 may slide relatively together without interference, the confronting ends thereof are beveled as shown best in FIG. 3.

After the end fitting 94 is received by the square bore 122, the drive shaft 118 is rotated by energization of an air actuator or other linear motor 138 mounted on the rear face of the mounting plate 114, the piston rod of which is connected by a fitting 140 to a link or lever 142, one end of which is affixed to an end portion of the drive shaft 118. A suitable stop (not shown) which may be built into the actuator 138 causes the drive shaft 118 to be stopped at the end of precisely 90° rotation. After such rotation the actuator 126 is energized to retract the mounting plate 114 and, accordingly, the drive shaft 118 away from the winding area. During the initial movement of the drive shaft 118 away from the winding form 52, the stop dog 106 enters that notch 104 which is now uppermost to lock the shaft 80 in the indexed position. After the plate 114 and, accordingly, the drive shaft 118 are fully retracted, the flier 14 can again be rotated to wind another coil.

With reference to FIGS. 2, 3 and 5, the shaft 88 which is journalled for rotation in the winding form 50 has flanges and a square end fitting designated 144, which parts are identical to those parts described above mounted on the shaft 80. The end fitting 144 is engaged by a drive shaft 146 having a square bore 147 driven through a link or lever 148 by an air actuator or other linear motor 150 in precisely the same manner as the drive shaft 118 so that both the shaft 80 and the shaft 88 are rotated at the same time. An adjustable stop 152 may be provided for accurately predetermining an aligned position of the drive shaft 118 with the square end fitting 94. A similar stop may be provided for engagement by the link or lever 148 which stop is not shown in FIG. 1 because it is hidden by the actuator 150.

Those familiar with the armature winding art will appreciate that fully conventional machine controls can be used to initiate apparatus for causing the shafts 80 and 88 to be rotated or indexed at the desired times during intervals when the fliers 12 and 14 are at rest between the winding of coils. Also, those familiar with the art will appreciate that drive means other than the particular apparatus disclosed herein may be provided for controlling the rotary positions of the cam-like wire guide discs. For example, the shafts upon which the discs are mounted could be driven by a mechanism operating beneath the winding forms in a manner similar to conventional drives for armature indexing. The apparatus described above is presently preferred because it positively positions the discs at all times, is relatively simple and rugged, and also because it occupies minimal space in the crowded winding area.

Although the presently preferred embodiment of this invention has been described, it will be understood that within the purview of this invention various changes may be made within the scope of the appended claims.

Having thus described my invention, I claim:

1. In a flier type armature winding machine of the type having means for guiding wire wound by a flier into coil receiving slots of an armature core mounted on an armature shaft, the improvement of means for forming the coil end turns toward various different spacings from the armature shaft while coils are being wound, said improvement including a wire guide member mounted adjacent the armature shaft and the end of the armature core, said wire guide member having a first wire guide surface portion in the path of wire being wound into a coil by said flier, means mounting said wire guide member adjacent said armature shaft for rotation about an axis parallel to said armature shaft, said last mentioned means including an axle supported for rotation about said axis, an end portion of said axle projecting beyond said wire guide member, said wire guide member having a second wire guide surface portion circumferentially spaced from said first wire guide surface portion out of the path of the wire when said first mentioned wire guide surface portion is in the path of the wire, and drive means for rotating said wire guide member including means for engaging and rotating said projecting end of said axle about said axis to move said first mentioned wire guide surface portion out of the path of the wire and said second mentioned wire guide surface portion into the path of the wire, said second mentioned surface portion having a wire guiding surface contour different from said first mentioned wire guide surface portion.

2. The improvement of claim 1 further including means mounting said drive means for movement toward and away from said axle and means for moving said drive means away from said axle to a position remote therefrom so as not to interfere with the winding of coils and toward said axle in preparation for the rotation of said axle about said axis.

3. The improvement of claim 2 further including a second wire guide member mounted on said axle and having first and second wire guide surface portions aligned respectively with said first and second wire guide surface portions of said first mentioned wire guide member, said first and second wire guide members being positioned adjacent opposite ends of an armature being wound thereby to form the coil end turns at both ends of the armature core.

4. The improvement of claim 3 wherein each of said first and said second wire guide members has a total of four circumferentially spaced differently contoured wire guide surface portions, whereupon different ones of said wire guide surface portions may be positioned in the path of the wire used in winding the coils by incremental rotation of said shaft through successive 90° intervals.

5. A flier type armature winding machine of the type utilized to wind successive coils of wire into successive, spaced pairs of slots in an armature core mounted on an armature shaft, said machine comprising: a flier and means for rotating said flier about a predetermined axis to form coils in the armature core; a winding form mounted adjacent said flier and having wire guide surfaces located in the path of wire leading from said flier for guiding wire into coil receiving slots in the armature core while the coils are being wound; means for forming the end turns of the coils guided into said slots into different spacings from the armature shaft while the coils are being wound, said means including a wire guide member, mounting means mounting said wire guide member on said winding form adjacent the armature shaft and the end of the armature core and for rotation relative to said wire guide surfaces of said winding form about an axis parallel to the armature shaft, said wire guide member having circumferentially spaced wire guide surface portions, drive means for rotating said wire guide member relative to said winding form thereby to position different ones of said surface portions of said wire guide member into the path of the wire being guided by said wire guide surfaces of said winding form into said slots during the winding of different coils by said flier.

6. The apparatus of claim 5 wherein said mounting means includes an axle journalled for rotation in said winding form.

7. The apparatus of claim 6 wherein said drive means includes means engaging and rotating said axle, means mounting said drive means for movement toward and away from said axle, and means for moving said drive means away from said axle to a position remote therefrom so as not to interfere with the winding of coils and toward said axle in preparation for the rotation of said axle about said axis.

8. The improvement of claim 6 further including a second wire guide member mounted on said axle, said first mentioned wire guide member and said second wire guide member being spaced to straddle an armature to be wound thereby to form the coil end turns at both ends of the armature core.

* * * * *

UNITED STATES PATENT OFFICE
CERTIFICATE OF CORRECTION

Patent No. 3,785,580          Dated  January 15, 1974

Inventor(s) John B. Kennedy and Kenneth L. Pepper

It is certified that error appears in the above-identified patent and that said Letters Patent are hereby corrected as shown below:

Col. 1, line 56, change "where" to ---Where---.
Col. 1, line 61, change "set" to ---sets---.
Col. 2, line 19, change "time" to ---timed---.
Col. 3, line 51, change "space" (first occurrence) to ---shaft---.
Col. 4, line 41, change "surfaces" to ---surface---.
Col. 4, line 46, change "ends" to ---end---.
Col. 4, line 46, change "said" to ---the---.
Col. 5, line 7, change "disc" to ---discs---.
Col. 6, line 12, change "pairs" to ---parts---.

Signed and sealed this 29th day of October 1974.

(SEAL)
Attest:

McCOY M. GIBSON JR.              C. MARSHALL DANN
Attesting Officer                Commissioner of Patents